United States Patent
Lambert

(10) Patent No.: US 11,001,115 B1
(45) Date of Patent: May 11, 2021

(54) TRACTION BAR

(71) Applicant: Justin Lambert, Bakersfield, CA (US)

(72) Inventor: Justin Lambert, Bakersfield, CA (US)

( * ) Notice: Subject to any disclaimer, the term of this patent is extended or adjusted under 35 U.S.C. 154(b) by 127 days.

(21) Appl. No.: 16/398,105

(22) Filed: Apr. 29, 2019

Related U.S. Application Data

(60) Provisional application No. 62/751,487, filed on Oct. 26, 2018.

(51) Int. Cl.
  *B60G 11/113* (2006.01)
  *B60G 7/02* (2006.01)
  *B60G 9/00* (2006.01)

(52) U.S. Cl.
  CPC .............. *B60G 11/113* (2013.01); *B60G 7/02* (2013.01); *B60G 9/003* (2013.01); *B60G 2200/31* (2013.01); *B60G 2204/143* (2013.01); *B60G 2204/4306* (2013.01)

(58) Field of Classification Search
  CPC ....... B60G 11/04; B60G 11/113; B60G 7/008; B60G 7/02; B60G 9/02; B60G 9/003; B60G 2200/314; B60G 2200/326; B60G 2204/4306
  See application file for complete search history.

(56) References Cited

U.S. PATENT DOCUMENTS

| | | | |
|---|---|---|---|
| 4,282,945 A | 8/1981 | Bessey | |
| 5,354,092 A * | 10/1994 | Calvert | B60G 17/023 267/242 |
| 6,386,565 B1 * | 5/2002 | Kugler | B60G 7/003 280/124.165 |
| 6,435,532 B2 * | 8/2002 | Hildebrand | B60G 7/001 280/124.175 |
| 7,360,778 B2 * | 4/2008 | Smith | B60G 7/001 267/260 |
| 7,918,469 B2 | 4/2011 | Hoppert | |
| 9,308,792 B2 | 4/2016 | Burns | |

OTHER PUBLICATIONS

Suspension Shop, Website Advertisement for Mcgaughys Part #50718, downloaded from www.suspensionshop.com on Mar. 19, 2019.

\* cited by examiner

*Primary Examiner* — Paul N Dickson
*Assistant Examiner* — Caitlin Anne Miller
(74) *Attorney, Agent, or Firm* — James M. Duncan; Scanlon Duncan LLP

(57) ABSTRACT

A traction bar prevents rotation of an axle housing for a vehicle utilizing leaf springs. A traction bar has a rigid rail member having a first end and a second end. The traction bar also has a pivoting shackle member having a proximal end and a distal end. The proximal end of the shackle member is pivotally attached to the vehicle frame or to a vehicle frame bracket attached to the vehicle's frame. The distal end of the shackle member is pivotally attached to the first end of the rigid rail member. An axle bracket is pivotally attached to the second end of the rigid rail member. The three pivots provided with the traction bar provide for normal movement of the suspension without binding. However, upon acceleration or high torque load, the shackle member is thrust into axial alignment with the rigid rail member, stopping forward motion of the rigid rail member.

17 Claims, 4 Drawing Sheets

TRACTION BAR

RELATED APPLICATIONS

THIS IS A NON-PROVISIONAL PATENT APPLICATION CLAIMING DOMESTIC PRIORITY TO U.S. PROVISIONAL APPLICATION 62/751,487 FILED OCT. 26, 2018.

BACKGROUND OF INVENTION

The invention generally relates to vehicular suspensions. The present invention more specifically relates to the prevention of "axle wrap".

Vehicles having leaf spring rear suspensions, particularly with vehicles having lifted suspensions or high torque or soft spring rate leaf springs, are subject to "axle wrap". Axle wrap occurs when torque from the vehicle power plant transferred through the drivetrain is applied to the rear axle, such as when a heavy load is towed or the vehicle is heavily accelerated, causing the axle to rotate, or "wrap", in the opposite direction from the tire rotation. because the axle is held in place by the leaf springs, the torque is transferred to the leaf springs causing a bending force in the leaf spring. This applied torque causes the leaf springs to flex or bend, which then allows the axle to rotate non-desirably. The bending of the leaf springs robs some of the torque from the power plant, causes unwanted stress and possible damage to the drive line components. If the bending of the leaf springs, reaches a high enough force, the leaf spring can "snap" back into its original state, then bend again and snap back repeatedly which causes a vibration felt throughout the vehicle and can sometimes cause "wheel hop" where the rear tires intermittently lose traction.

The general solution to this problem, without making the leaf springs stiffer which would result in a harsh ride quality, is to utilize a traction bar to limit the axle wrap. Traction bars generally resist the torque in the leaf springs but do not stop the axle from moving up and down during general suspension use. One type of traction bar has pivots at both ends, where one end mounts to the vehicle chassis and the other end mounts to the rear axle, generally underneath the centerline of the axle, such that torque applied to the differential is transferred through the traction bar into the chassis in a forward direction, which helps to transfer the previously wasted torque from bending the leaf springs, into a force that supports forward motion of the vehicle. However, while this device will control the movement of axle wrap, it has the negative result of binding the rear suspension during the suspension travel cycle since this device generally has geometry that is fixed in length with the fixed pivot at the chassis attachment and the floating pivot at the axle a fixed length away which is intended to move with the suspension travel.

A leaf spring has a front fixed pivot attached to the chassis, and generally but not always a rear floating pivot attached to the chassis with a shackle. The axle is attached near the middle of the length of the leaf spring if there is a floating rear pivot or to the rear of the leaf spring if there is no rear leaf spring attachment. The binding is a result of the leaf spring movements not matching the traction bar movements during the suspension cycle. A leaf spring by nature bends during the suspension cycle thus changing the length between the front fixed pivot and the axle attachment, whereas the traction bar with fixed front pivot does not change length to be able to swing in the same are as the leaf spring does.

Embodiments of the present invention prevent axle wrap while also preventing binding during the suspension travel cycle.

SUMMARY OF THE INVENTION

The inventor herein has designed a new traction bar which utilizes a shackle apparatus which allows free motion so there is no binding, but when during acceleration unwanted axle wrap is limited by using the extended length limit of the shackle, where the shackle and traction bar are in general axial alignment. Embodiments of the present invention may have the shackle attached in front of the axle housing or behind the axle housing.

In one embodiment of the present invention, a traction bar has a shackle attached in a nearly linear position relative to the traction bar itself, where an angle formed by a first axis defined by the traction bar and a second axis defined by the shackle is less than twenty degrees. A proximal end of the shackle may be pivotally attached to a portion of the vehicle frame or to a bracket disposed between the vehicle frame and the shackle. A distal end of the shackle is pivotally attached to an end of the traction bar. An axle bracket is pivotally attached to the opposite end of the traction bar, with the axle bracket attached to the rear axle housing. This configuration provides three pivot points in near axial alignment resulting in a dynamic geometry which allows free motion of the axle (i.e. thereby preventing binding) for suspension purposes, but during acceleration the bar and attached shackle reach a length limit thereby controlling or restraining rotation of the axle and limiting unwanted axle wrap. With the nearly linear positioned shackle and bar, the axle has freedom of movement to prevent binding, but during acceleration twisting motion of the axle maxes out the combined length of the shackle and the bar and thereby prevents the axle from wrapping further than acceptable.

The invention is installed on a vehicle having a frame, a rear axle housing, and a suspension comprising leaf springs, where the suspension permits relative motion between the axle housing and frame. For such a vehicle, one embodiment of the disclosed traction bar has a rigid rail member having a first end and a second end, which may correspond to a front end oriented towards the front of the vehicle and a rear end oriented toward the rear of the vehicle. In this embodiment, the traction bar is positioned such that the entire length of the bar is forward of the axle housing. However, in another embodiment, the entire length of the bar may be positioned to the rear of the axle housing.

DETAILED DESCRIPTION OF THE EMBODIMENTS

Figure 1:
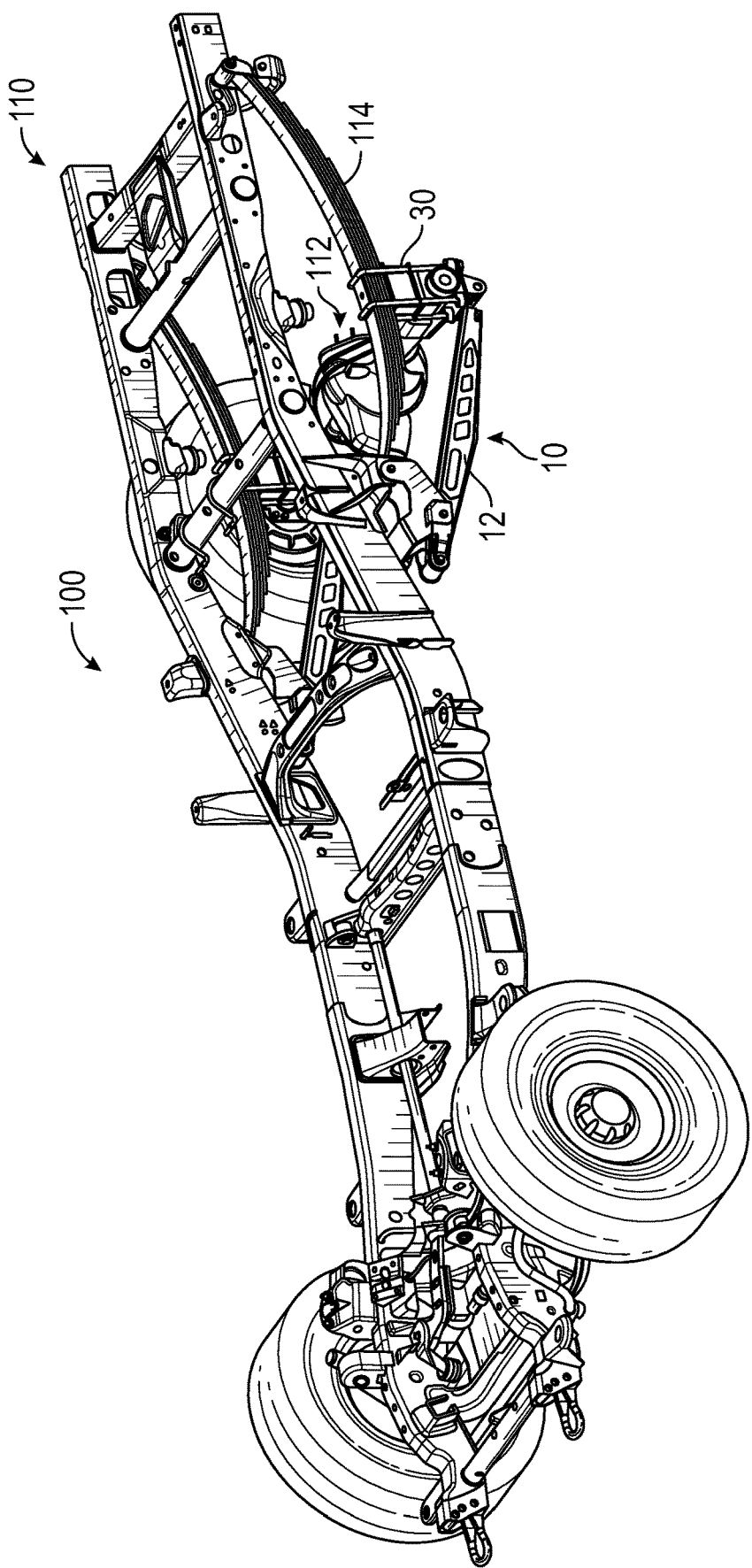
FIG. 1 depicts a front side perspective view of a vehicle chassis with an embodiment of the disclosed traction bar on each side of the rear of the chassis.
Figure 2:
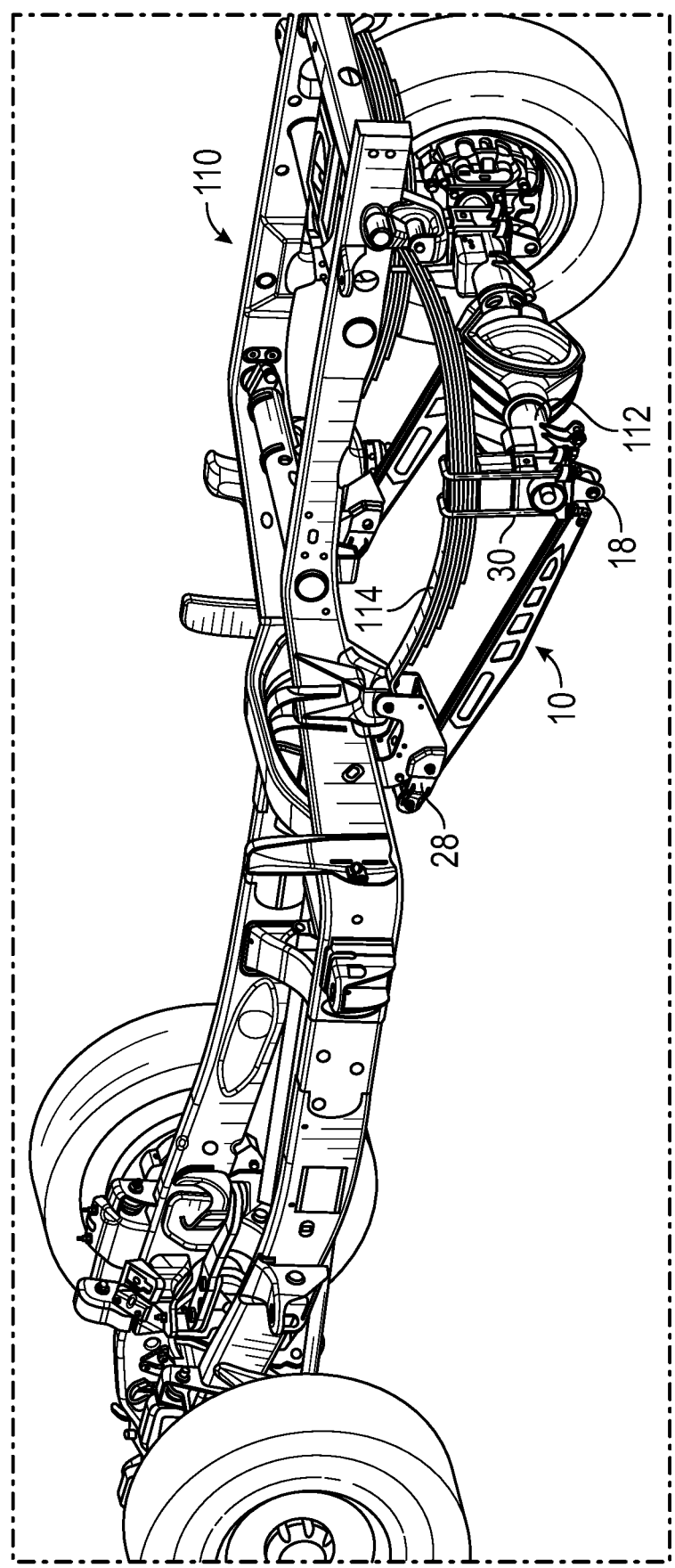
FIG. 2 depicts a rear side perspective view of a vehicle chassis with an embodiment of the disclosed traction bar on each side of the rear of the chassis.

FIG. 1 depicts a front perspective view of a vehicle 100 to which embodiments of the traction bar 10 are mounted on either side. The vehicle 100 has a frame 110, a rear axle housing 112, and a suspension comprising leaf springs 114. Rear axle housing 112 has a front side facing the front of the vehicle and a rear side facing the rear of the vehicle. FIG. 2 depicts a rear perspective view of the vehicle. As shown in FIGS. 1 and 2, embodiments of the traction bar 10 span between the rear axle housing 112 and a position of the vehicle frame 110 forward of the rear axle housing. This position may or may not be where the front end of leaf springs 114 are attached to the frame 110. Alternatively, embodiments of the traction bar may be installed such that the traction bar 10 spans between the rear axle housing 112 and a position of the vehicle frame 110 rearward of the rear axle housing.

Figure 3A:
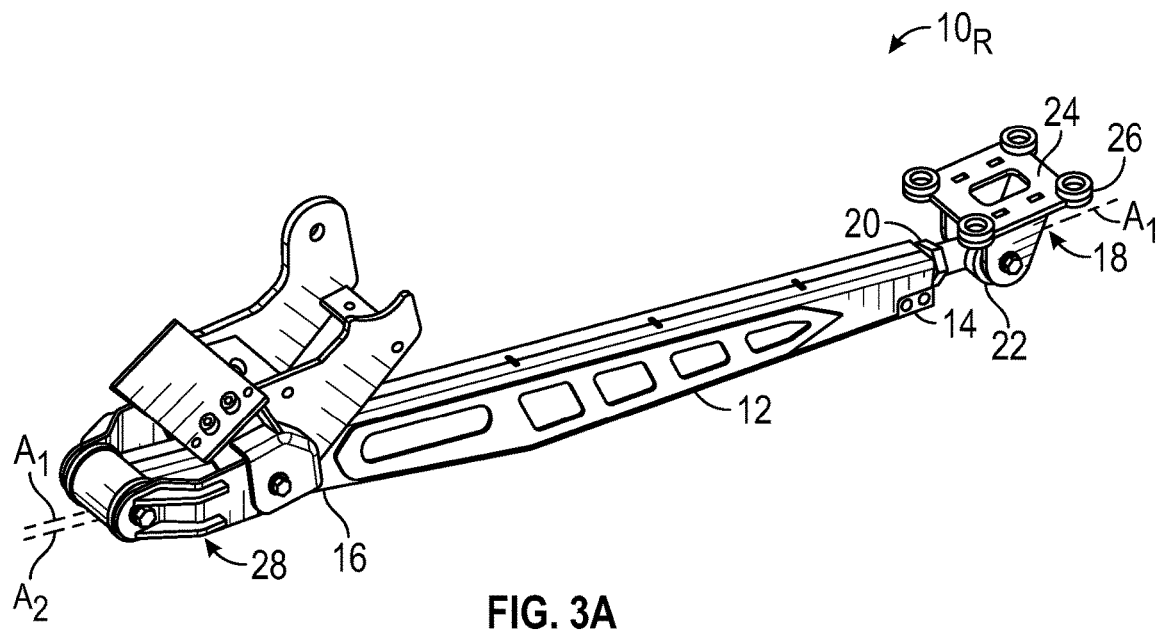
FIGS. 3A and 3B depict assembled embodiments of the disclosed traction bar.
Figure 3B:
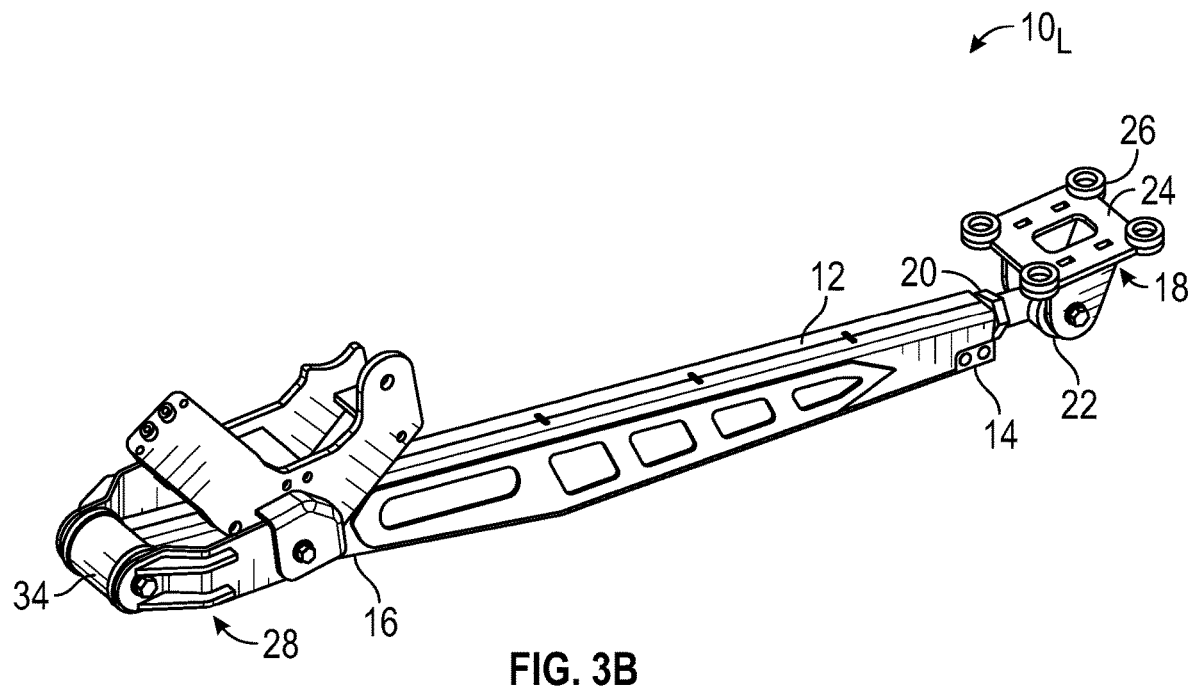
Figure 4A:
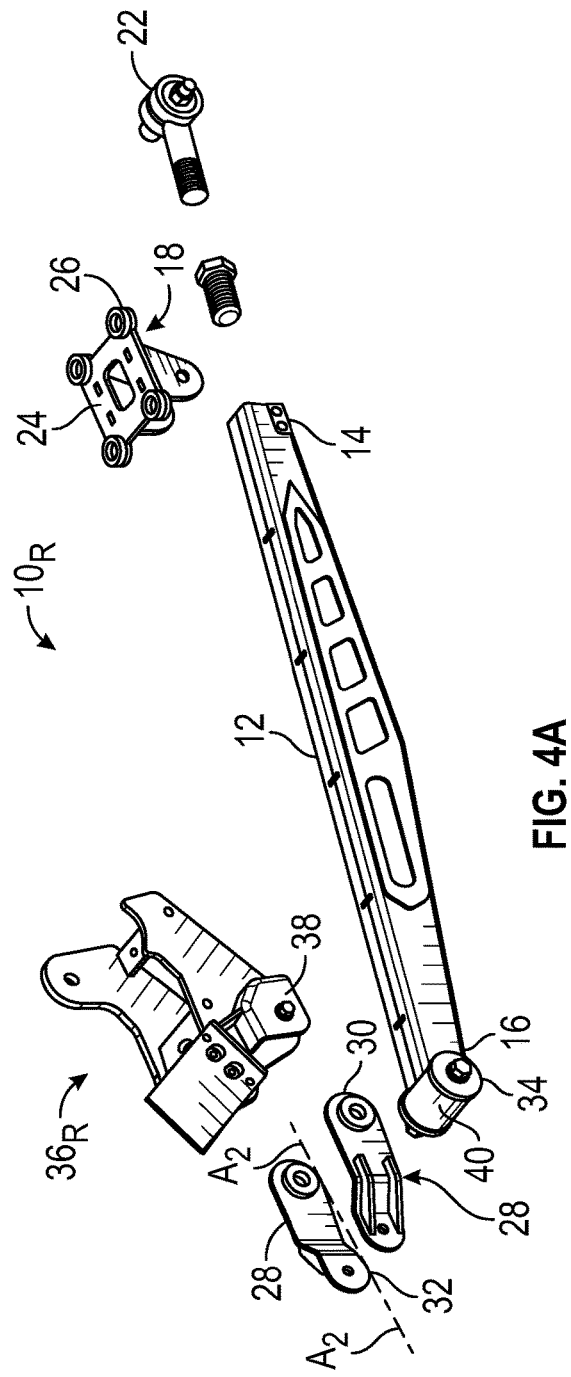
FIGS. 4A and 4B depict exploded views of the embodiments of the traction bar depicted in FIGS. 3A and 3B.
Figure 4B:
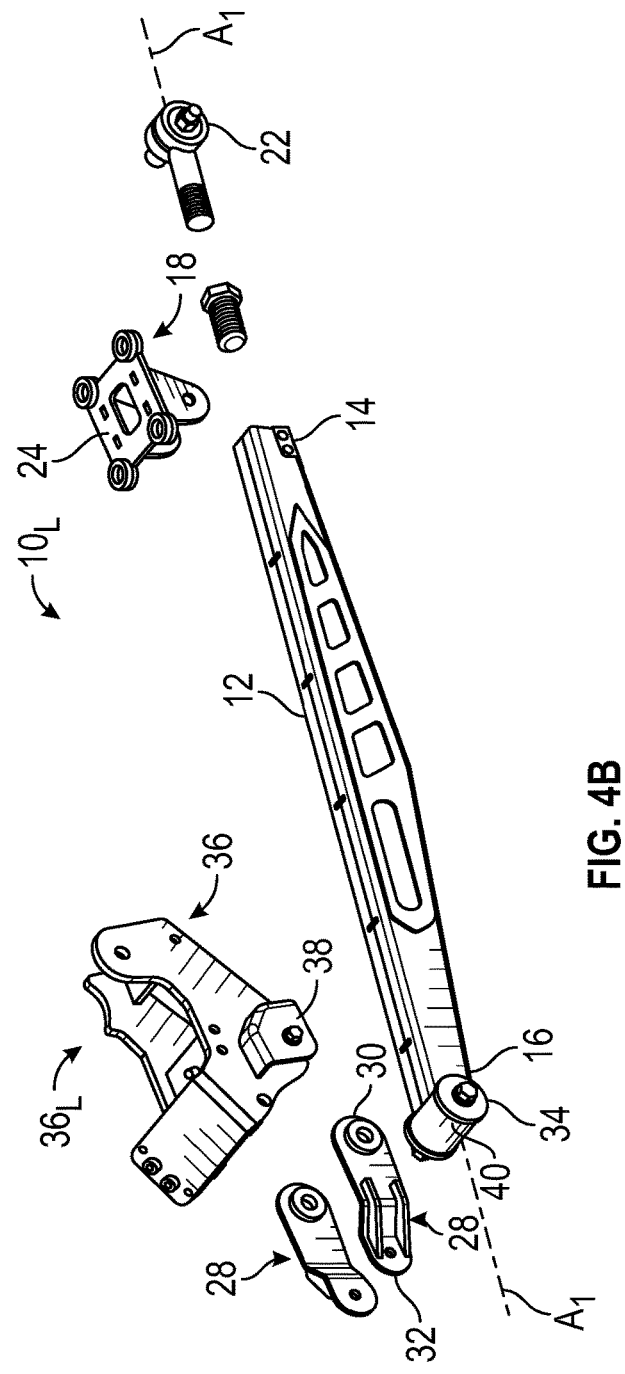

FIGS. 3A and 4A depict embodiments of the traction bar 10$_R$ for the right side of the vehicle 100, while FIGS. 3B and 4B depict embodiments of the 10$_L$ for the left side of the vehicle. Except for shackle attachment brackets 36$_R$ and 36$_L$, the components of 10$_R$ and 10$_L$ are the same and the following description applies to both.

As shown in these figures, each traction bar 10 has a rigid rail member 12. The rigid rail member 12 may be of a tubular construction in a round, square, rectangular, or other configuration. Alternatively, the rigid rail member may be a solid rod. The rigid rail member 12 has a rear end 14 and a front end 16 wherein an axis $A_1$ is defined between rear end 14 and front end 16. A rear bracket 18 is pivotally attached to the rear end 14 of the rigid rail member 12. Rear bracket 18 may utilize an attachment mechanism 20, such as indicated in FIGS. 4A and 4B, which allows for length adjustment. A pivotal attachment 22 connects rear bracket 18 to attachment mechanism 20. The pivotal attachment 22 may utilize bearings or bushings. Rear bracket 18 has a plate 24 which is configured to attach to the rear axle housing 112. Plate 24 may have apertures 26 configured to receive U-Bolts 30 in the manner shown in FIGS. 1 and 2 to attach rear bracket 18 to rear axle housing 112.

Traction bar 10 has a shackle member 28. As indicated in the figures, shackle member 28 may be of a two piece construction. Shackle member 28 has a proximal end 30 and a distal end 32 where an axis $A_2$ is defined there between. The front end 16 of rigid rail member 12 is pivotally attached to the distal end 32 of the shackle member 28, with bearings or a transversely mounted bushing 40 provided at the pivot point 34. Proximal end 30 of shackle member 28 may be directly attached to frame 110 at a pivot point. Alternatively, proximal end 30 of shackle member 28 may be pivotally attached to shackle attachment member 36 at pivot point 38. Shackle attachment member 36 is attached to frame 110.

FIGS. 3A and 3B depict axis $A_1$ and axis $A_2$ in substantial axial alignment. However, during operation of the traction bar 10 an acute angle may be formed between $A_1$ and $A_2$ up to twenty degrees.

In the above configuration, upon application of a high torque load or acceleration of the vehicle, rear axle housing 110, which is attached to rear bracket 18, is restrained from rotation by the engagement of the front end 16 of rigid rail member 12 with the distal end 32 of the shackle member 28. The restraint is applied at the time when the shackle member 28 is in approximate axial alignment with rigid rail member 12.

While the above is a description of various embodiments of the present invention, further modifications may be employed without departing from the spirit and scope of the present invention. For example, the size, shape, and/or material of the various components may be changed as desired. Thus the scope of the invention should not be limited by the specific structures disclosed. Instead the true scope of the invention should be determined by the following claims.

What is claimed is:

1. A traction bar for a vehicle, the vehicle having a frame, a rear axle housing having a front side and a rear side, and a suspension comprising leaf springs, the suspension permitting relative motion between the axle housing and frame, said traction bar comprising:
    a rigid member having a first end and a second end, wherein a first axis is defined between the first end and the second end;
    an axle attachment bracket comprising a plate member pivotally attached to the second end of the rigid member, the plate member configured to attach to the rear axle housing; and
    a shackle member having a proximal end and a distal end, wherein a second axis is defined between the proximal end and the distal end of the shackle member, wherein an acute angle of twenty degrees or less is defined between the first axis and the second axis, wherein the proximal end of the shackle member is pivotally attached to the frame and the distal end of the shackle member is attached to the first end of the rigid member, wherein axial motion of the rigid member is restrained by the shackle member.

2. The traction bar of claim 1 further comprising a shackle attachment bracket disposed between the proximal end of the shackle member and the frame.

3. The traction bar of claim 1 wherein the shackle member comprises a left side member and a right side member.

4. The traction bar of claim 3 wherein the first end of the rigid member comprises a transversely mounted bushing.

5. The traction bar of claim 1 wherein the proximal end of the shackle is attached to the frame at a position to the front side of the axle housing.

6. The traction bar of claim 1 wherein the proximal end of the shackle is attached to the frame at a position to the rear side of the axle housing.

7. The traction bar of claim 1 wherein the axle attachment bracket attaches to the second end of the rigid member with a length adjustable attachment mechanism.

8. A traction bar for a vehicle, the vehicle having a frame, a rear axle housing having a front side and a rear side, and a suspension comprising leaf springs, the suspension permitting relative motion between the axle housing and frame, said traction bar comprising:
    a rigid member having a first end and a second end, wherein a first axis is defined by a line extending from the first end to the second end;
    a shackle member having a proximal end and a distal end, wherein the distal end of the shackle member is attached to the first end of the rigid member at a first pivot point and the proximal end of the shackle member is pivotally attached to the frame at a second pivot point and a second axis is defined by a line extending between the first pivot point and the second pivot point; and
    an axle attachment bracket comprising a plate member is pivotally attached to the second end of the rigid member at a third pivot point, the plate member configured to attach to the rear axle housing, wherein, the first pivot point and the third pivot point are in axial alignment, an acute angle is defined by the first axis and the second axis, and axial motion of the rigid member is restrained by the shackle member.

9. The traction bar of claim 8 further comprising a shackle attachment bracket disposed between the proximal end of the shackle member and the frame.

10. The traction bar of claim 8 wherein the shackle member comprises a left side member and a right side member.

11. The traction bar of claim 10 wherein the first end of the rigid member comprises a transversely mounted bushing.

12. The traction bar of claim 8 wherein the proximal end of the shackle is attached to the frame at a position to the front side of the axle housing.

13. The traction bar of claim 8 wherein the proximal end of the shackle is attached to the frame at a position to the rear side of the axle housing.

14. The traction bar of claim 8 wherein the axle attachment bracket attaches to the second end of the rigid member with a length adjustable attachment mechanism.

15. A traction bar for a vehicle, the vehicle having a frame, a rear axle housing, and a suspension comprising leaf springs, the suspension permitting relative motion between the axle housing and frame, said traction bar comprising:
    a rigid member having a rear end and a front end wherein a first axis is defined between the rear end and the front end of the rigid member;
    a rear bracket comprising a plate member pivotally attached to the rear end of the rigid member, the plate member configured to attach to the rear axle housing;
    a shackle member having a proximal end and a distal end, wherein a second axis is defined between the proximal end and the distal end, wherein the front end of the rigid member is pivotally attached to the distal end;
    wherein an angle is defined between the first axis and the second axis; and
    a front bracket having a fixed attachment to the frame and pivotally attached to the proximal end of the shackle member, whereupon acceleration of the vehicle, twisting of the rear axle housing is limited by an engagement of the front end of the rigid member with the distal end of the shackle member and the angle varies in a range of zero to twenty degrees.

16. The traction bar of claim 15 wherein the shackle member comprises a left side member and a right side member.

17. The traction bar of claim 15 wherein the rear bracket attaches to the rear end of the rigid member with a length adjustable attachment mechanism.

\* \* \* \* \*